(12) United States Patent
Ganapathy

(10) Patent No.: US 11,178,465 B2
(45) Date of Patent: Nov. 16, 2021

(54) SYSTEM AND METHOD FOR AUTOMATIC SUBTITLE DISPLAY

(71) Applicant: Harman International Industries, Incorporated, Stamford, CT (US)

(72) Inventor: Girisha Ganapathy, Bangalore (IN)

(73) Assignee: Harman International Industries, Incorporated, Stamford, CT (US)

(*) Notice: Subject to any disclaimer, the term of this patent is extended or adjusted under 35 U.S.C. 154(b) by 163 days.

(21) Appl. No.: 16/149,996

(22) Filed: Oct. 2, 2018

(65) Prior Publication Data
US 2020/0107078 A1 Apr. 2, 2020

(51) Int. Cl.
| | |
|---|---|
| *H04N 7/10* | (2006.01) |
| *H04N 21/488* | (2011.01) |
| *H04N 21/8547* | (2011.01) |
| *G06K 9/00* | (2006.01) |
| *G10L 15/00* | (2013.01) |

(52) U.S. Cl.
CPC ..... *H04N 21/4884* (2013.01); *G06K 9/00228* (2013.01); *G10L 15/005* (2013.01); *H04N 21/8547* (2013.01)

(58) Field of Classification Search
CPC ........... H04N 21/4884; H04N 21/8547; H04N 21/4307; H04N 21/44008; H04N 21/42203; H04N 21/4394; H04N 21/4223; H04N 21/41422; H04N 21/435; H04N 21/4856; H04N 5/278; G06K 9/00228; G10L 15/005; G10L 15/00; G10L 15/01; G10L 15/26; G06F 40/263; G06F 3/16; B60K 2370/739

USPC .......................................................... 725/32
See application file for complete search history.

(56) References Cited

U.S. PATENT DOCUMENTS

| | | | |
|---|---|---|---|
| 8,156,114 B2 * | 4/2012 | Byers | G06F 16/48 707/725 |
| 8,260,615 B1 * | 9/2012 | Nakajima | G10L 15/183 704/257 |
| 9,571,870 B1 * | 2/2017 | Wilson | G10L 15/005 |
| 9,934,785 B1 * | 4/2018 | Hulaud | G10L 15/22 |
| 2006/0224438 A1 | 10/2006 | Obuchi et al. | |
| 2011/0097056 A1 * | 4/2011 | Mears | H04N 21/4884 386/244 |

(Continued)

FOREIGN PATENT DOCUMENTS

EP 2933607 A1 10/2015

*Primary Examiner* — Jefferey F Harold
*Assistant Examiner* — Sahar Aqil Riaz
(74) *Attorney, Agent, or Firm* — McCoy Russell LLP

(57) ABSTRACT

The present disclosure relates to systems, devices and methods for automatic subtitle display. In one embodiment, a method is provided that includes determining a conversation language for a space, and identifying display content presented in the space on a display. The method may also include requesting subtitle data for the display content based on the conversation language determined for the space, and controlling, by the control device, presentation of subtitle data for the display content for output on the device, wherein subtitle data presented is selected for the determined conversation language. Processes and configurations can include determining conversation language by one or more of speech recognition, facial recognition, and user profile settings. In addition, automatic subtitle display may be provided for displays in a vehicle cabin and viewing areas of a display device in general.

18 Claims, 3 Drawing Sheets

(56) References Cited

U.S. PATENT DOCUMENTS

| | | | |
|---|---|---|---|
| 2012/0169583 A1* | 7/2012 | Rippel | H04N 5/4403 345/156 |
| 2015/0179184 A1* | 6/2015 | Cudak | G10L 21/0208 704/233 |
| 2015/0304727 A1 | 10/2015 | Vandichalrajan | |
| 2015/0325268 A1* | 11/2015 | Berger | H04N 21/44204 386/248 |
| 2016/0055786 A1* | 2/2016 | Skolicki | G06F 16/70 345/207 |
| 2016/0127807 A1* | 5/2016 | Templeman | H04N 21/8153 725/41 |
| 2018/0053518 A1* | 2/2018 | Chrisman | G10L 25/84 |
| 2018/0233130 A1* | 8/2018 | Kaskari | G10L 15/16 |
| 2018/0342239 A1* | 11/2018 | Baughman | G10L 15/005 |
| 2019/0080691 A1* | 3/2019 | Meng | G10L 15/22 |
| 2019/0197430 A1* | 6/2019 | Arditi | G01C 21/3438 |
| 2020/0007946 A1* | 1/2020 | Olkha | H04N 21/25891 |

* cited by examiner

SYSTEM AND METHOD FOR AUTOMATIC SUBTITLE DISPLAY

FIELD

The present disclosure relates to systems, methods and devices for controlling display elements, and more particularly to presentation of automatic subtitle display for display devices and vehicles.

BACKGROUND

Media content typically includes sound in a single language. Sometimes, audio data for the media content is dubbed such that additional or supplementary recordings replace the original production sound in a post-production process. Dubbing sound for media content can be labor intensive. In addition the sound quality of the media is often reduced. For many types of media, viewers desire the ability to understand voice or speech of the media. Some broadcast formats include secondary audio accompanied with the media and the media player can be set to include subtitles. There exists a need to provide display devices with additional subtitle information not limited to a fixed set of subtitle information provided with the media.

Many display devices are not configured to provide content other than information that is received by an input. Conventional display devices are usually programmed for a particular set of operation languages. There is a desire to provide display devices with the ability to access and present media with a desired language.

BRIEF SUMMARY OF THE EMBODIMENTS

Disclosed and claimed herein are methods, devices and systems for automatic subtitle display. One embodiment is directed to a method including determining, by a control device, a conversation language for a space. The method also includes identifying, by the control device, display content presented in the space on a display and requesting, by the control device, subtitle data for the display content based on the conversation language determined for the space. The method also includes controlling, by the control device, presentation of subtitle data for the display content for output on the device, wherein subtitle data presented is selected for the determined conversation language.

In one embodiment, determining conversation language includes performing a speech recognition operation on passenger voice data detected in the space.

In one embodiment, determining conversation language includes performing a facial recognition operation on image data detected in the space.

In one embodiment, determining conversation language includes determining a user profile setting for a passenger in the space.

In one embodiment, the space is a vehicle cabin, and conversation language includes passenger voice data detected for a vehicle cabin passenger.

In one embodiment, the space is associated with a viewing area of a display device, and conversation language includes voice data detected in the viewing area.

In one embodiment, identifying display content includes determining at least one of title, source, and identifier for the display content.

In one embodiment, subtitle data includes at least one of a textual and graphical representation of audio and speech data for the display content.

In one embodiment, controlling presentation of the subtitle data includes synchronizing output of the subtitle data to timing of the display content.

In one embodiment, the method includes displaying a notification for the subtitle data and receiving user input for the subtitle data, wherein presentation of the subtitle data is in response to user input received.

Another embodiment is directed to a system including a display and a control device coupled to the display. The control device is configured to determine a conversation language for a space, identify display content presented in the space on a display, and request subtitle data for the display content based on the conversation language determined for the space. The control device is also configured to control presentation of subtitle data for the display content for output on the device, wherein subtitle data presented is selected for the determined conversation language.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1B:
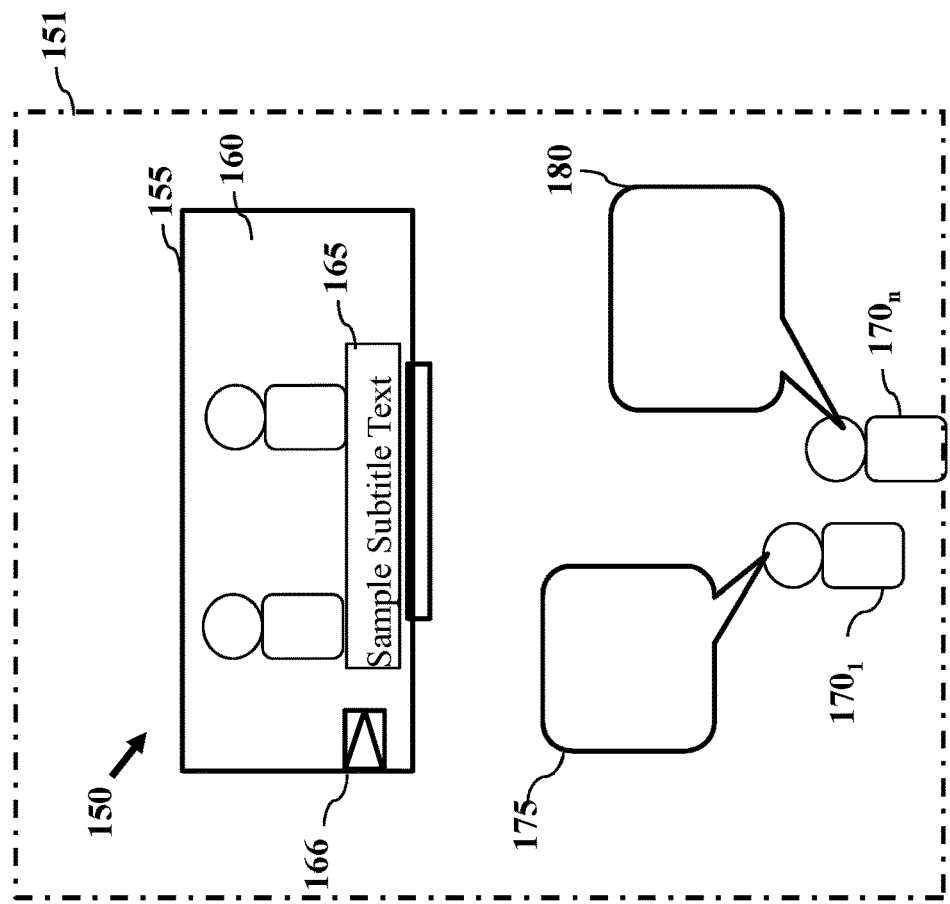
FIGS. 1A-1B depict graphical representations of subtitle display according to one or more embodiments.

One aspect of the disclosure is directed to controlling operations of a display device. Processes and device configurations are provided to allow for automatic subtitle display. In one embodiment, a process is provided that includes controlling presentation of subtitle data for display content output on a device. The process may include performing at least one operation to determine a conversation language relative to the display. In one embodiment, subtitle data is presented for the determined conversation language in a vehicle. Other embodiments are directed to presentation of subtitle data for display devices in general.

In one embodiment, a system is provided including a display and a control device coupled to the display. The control device is configured to determine a conversation language for a space and identify display content presented on a display. Based on the conversation language, the control device may request subtitle data for the display content. The control device may also be configured to control presentation of subtitle data for the display content for output on the device. Subtitle data presented by the display may be selected by the control device for the determined conversation language.

Processes and configurations described herein may be configured to identify display content presented in the space and request subtitle data for display content based on the conversation language determined for the space. In one embodiment, determining conversation languages may be based on a space relative to a display. By way of example, conversation language may be relative to a space or area within a vehicle cabin. In other embodiments, determining conversation language of a space may be relative to a viewing area of a display device (e.g., TV, projector, etc.). Presentation of subtitle data for the display content may be controlled for output on the device.

According to one embodiment, conversation language in a vehicle cabin may be determined by one or more operations including speech recognition, natural language processing and/or artificial intelligence (AI). In certain embodiments, one or more parameters for determining conversation language include determining a language identified in a user profile. In other embodiments, determining conversation language can include performing facial recognition operations. Facial recognition may be performed to identify nationality of one or more individuals in a space relative to the display. The determined conversation language can be used to identify the most relevant subtitle. Operations are also described herein to download subtitle data with display content, such as video, automatically. With respect to vehicle configurations, such as a vehicle display for the vehicle cabin, determining conversation language as discussed herein can overcome issues with driver distraction. For example, requests by vehicle passengers, such as young children, to provide subtitle data can be handled by processes and configurations without requiring driver programming of the subtitle data.

According to one embodiment, operations and configurations can provide improvements to display devices such as televisions. For broadcast programming (e.g., live TV), operations discussed herein can provide functions to allow for determination of a conversation language relative to the display device and presentation of subtitle data.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

EXEMPLARY EMBODIMENTS

Figure 1A:
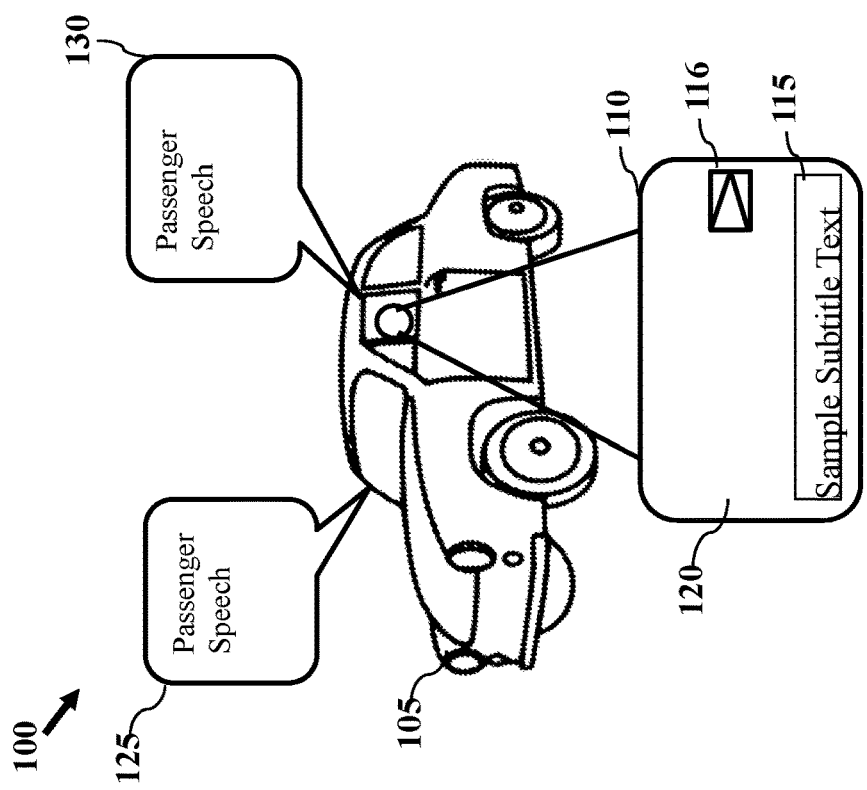

Referring now to the figures, FIGS. 1A-1B depict graphical representations of subtitle display according to one or more embodiments. FIG. 1A provides a graphical representation of a system 100 for vehicle 105 including display 110. According to one embodiment, the interior space of vehicle 100 may accommodate one of more passengers. In addition, vehicle 105 may include a control device (not shown in FIG. 1A) configured to control operation of display 110. According to one embodiment, display 110 may be configured to present display content 120. According to another embodiment, a control device of vehicle 105, such as control device 305 of FIG. 3, may be configured to determine a conversation language within the passenger compartment, or cabin, of vehicle 105. As will be discussed herein, configurations and processes are provided to request subtitle data for display content 120 based on a determined conversation language in a space, such as within vehicle 105.

Vehicle 105 may be configured to control presentation of subtitle data, such as subtitle text 115, with display content 120. As will be discussed in more detail below, a control device (e.g., control device 305 of FIG. 3) may be configured to detect a conversation language within vehicle 105. FIG. 1A includes representations of passenger speech 125 and 130. In one embodiment, passenger speech 125 and 130 may relate to regular or non-command conversation between occupants. According to one embodiment, the control device of vehicle 105 is configured to detect passenger speech 125 and 130 and determine a conversation language based on passenger speech. Subtitle text 115 may be presented based on the determined conversation language. As will be discussed in more detail below, subtitle text 115 may be presented based on a conversation language determined from imaging of passengers and/or one or more user settings for subtitle language. The control unit of display 110 and/or vehicle 105 may be configured perform the processes (e.g., process 200, process 400, process 500, etc.) described herein for presentation of subtitle text 115.

In one embodiment, passenger speech 125 and 130 may relate to regular or non-command conversation between occupants. According to one embodiment, determining conversation language may be based on natural-language instructions from one or more occupants of the vehicle. By way of example, passenger speech, such as passenger speech 125 and 130, may be detected and interpreted such that commands to present subtitle data in one or more languages may be interpreted. In one embodiment, passenger speech 125 and 130 may relate to conversational language such as, "turn here," "have a good day," and "I'm turning here," in one or more languages. In one embodiment, passenger speech 125 and 130 may relate to one or more commands including identification of a desired language. By way of example, a natural language command of "English subtitles" may result in the control device identifying language as English and control to present subtitle information in the detected language. Alternative examples of natural language commands detected by the control device may include, "change subtitle language" and "display subtitles in my language." Passenger speech 125 and 130 may include commands to operate with one or more functions of display 110 and graphical element 116. As such, the language used for natural language commands may be identified to determine a conversation language for subtitle data.

FIG. 1A also shows graphical element 116 which may be presented on display 120 to indicate one or more of automatic subtitle display and the availability of subtitle data based on conversation language. According to one embodiment, graphical element 116 may be a selectable element configured for activation, modifying and/or ending subtitle presentation of subtitle text 115.

FIG. 1B provides a graphical representation of a system 150 for display 155 in a viewing area or space 151. According to one embodiment, space 151, associated with display 155 may accommodate one of more viewers, such as viewers 170$_{1-n}$. Display 155 may include a control device (not shown in FIG. 1B) configured to control operation of display 155. According to one embodiment, display 155 may be configured to present display content 160. According to another embodiment, a control device of display 155, such as control device 305 of FIG. 3, may be configured to determine a conversation language within space 151. As will be discussed herein, configurations and processes are provided to request subtitle data for display content 160 based on a determined conversation language in space 151. The control unit of display 155 may be configured perform the processes (e.g., process 200, process 400, process 500, etc.) described herein for presentation of subtitle text 165.

Display 155 may be configured to control presentation of subtitle data, such as subtitle text 165, with display content 160. As will be discussed in more detail below, a control device (e.g., control device 305 of FIG. 3) may be configured to detect a conversation language within space 151. FIG. 1B includes representations of viewer speech 175 and 180. According to one embodiment, the control device of display 155 is configured to detect viewer speech 175 and 180 and determine a conversation language based on the viewer speech. Subtitle text 165 may be presented based on the determined conversation language viewer speech 175 and 180. As will be discussed in more detail below, subtitle text 165 may be presented based on a conversation language determined from imaging of viewers 170$_{1-n}$ and/or one or more user settings for subtitle language.

FIG. 1B also shows graphical element 166 which may be presented on display 155 to indicate one or more of automatic subtitle display and the availability of subtitle data based on conversation language. According to one embodiment, graphical element 166 may be a selectable element configured for activation, modifying and/or ending subtitle presentation of subtitle text 165.

Figure 2:
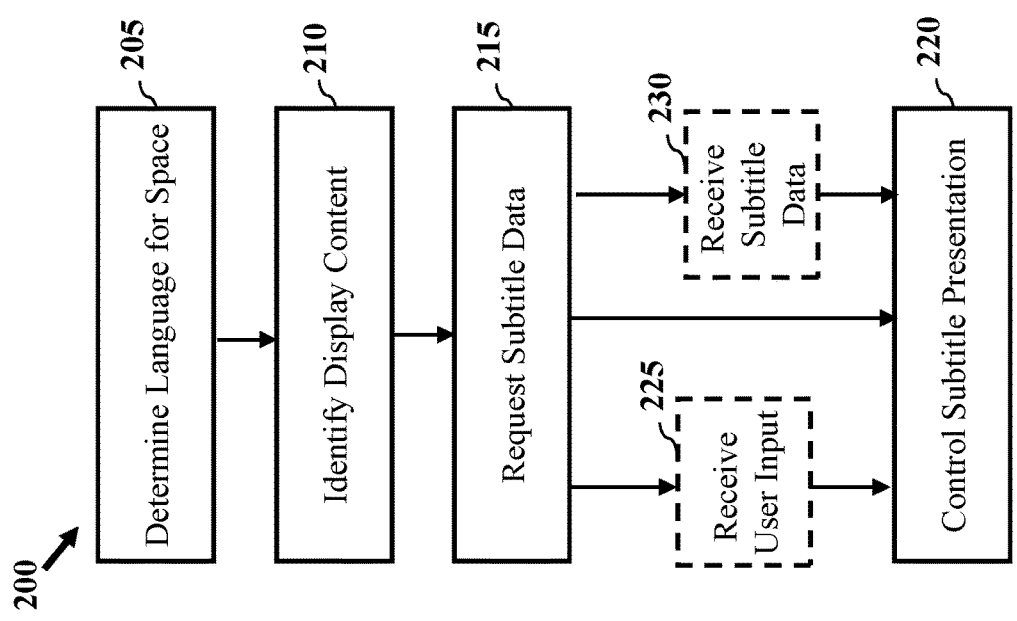
FIG. 2 depicts a process for automatic subtitle display according to one or more embodiments.

FIG. 2 depicts a process for automatic subtitle display according to one or more embodiments. According to one embodiment, process 200 may be performed by a control device of a vehicle (e.g., vehicle 105) including a display (e.g., display 110) for presentation of display content with subtitle data. According to another embodiment, process 200 may be performed by a control device of display device (e.g., display device 160) for presentation of subtitle data.

Process 200 may be initiated at block 205 with determining language for a space. In one embodiment, determining language includes determining a conversation language for the space. As used herein, conversation language can include determining the spoken human language for communication including the use of words in a structured and conventional way. In some embodiments, a conversation language may be determined by analyzing spoken words. Conversation language may be determined at block 205 prior to display of content. In other embodiments, conversation language may be determined at block 205 in response to display of content.

According to one embodiment, determining conversation language at block 205 includes performing a speech recognition operation on passenger voice data detected in the space. Each command may be identified by identifying an action and reference for the action According to one embodiment, determining conversation language at block 205 may include determining more than one language. In response to detecting more than one language a control device can select a conversation language. Selection of the conversation language may be based on the word count of each conversation language. By way of example, a conversation language detected having a greater word count for passenger speech may be selected. In other embodiments, process 200 may account for one or more other factors when multiple languages are concerned. One or more of a user input preference for language of subtitle presentation and facial recognition performed in the space may be employed to select one language over another language when multiple languages are identified. In yet another embodiment, a graphical element (e.g., graphical element 116, graphical element 166, etc.) may be presented on a display to allow a user to select a language detected.

Determining conversation language at block 205 may include performing one or more operations to characterize speech detected in a space. In one embodiment, one or more of sound and keyword recognition are used to identify possible languages. Phrases and sentences may be determined in addition to determining words. Process 200 may include parameters for natural language processing. In addition, process 200 may load a plurality of language and sound data sets as a reference. Languages and sound parameters may be assigned identifiers to allow for a control device to request subtitle data based on a determined language.

In one embodiment, determining conversation language at block 205 may include performing a voice recognition process including at least one of acoustic and language modelling. Acoustic modeling may include receiving audio data, detecting voice inputs, and identifying one or more linguistic units of the voice portion of audio data. The linguistic units may be used for language modelling including matching at least one of sounds and sequences of sounds to terms or words. In addition, patterns of speech such as a temporal pattern may be used to identify a spoken language.

In one embodiment, determining conversation language at block 205 may include identifying a spoken language between multiple passengers using at least one of voice differentiation, and voice location in the space. One or more microphones associated with the display or space may be used to detect human speech and characteristics of the speech. Speech detected in a first area of the space may be associated with a first passenger/viewer/individual, speech associated with a second area, which may be non-overlapping or located in a second different position, may be associated with a second passenger/viewer/individual. By assigning detected audio data a determining speech with at least one of the first location of the space and a second location of the space, speech from each location may be sequenced. Sequences of speech may be used to identify terms or language.

According to one embodiment, determining conversation language at block 205 includes performing a facial recognition operation on image data detected in the space. Conversation language can relate to a system of communication used by a particular community or country. In addition, parameters associated with people from a particular community or country may be associated with one or more national languages. According to one embodiment, a control unit may include one or more processes employed a trained data set for facial recognition. The trained data set may be based on a machine learned process for identifying facial features and correlating facial features to one or more languages. A trained data set and one or more processes for feature recognition may be performed by process 200.

In one embodiment, determining conversation language at block 205 includes determining a user profile setting for a passenger in the space. A display may provide a graphical display element (e.g., graphical element 116, graphical element 166, etc.) that operates as a user interface where a user can provide identify a desired conversation language of choice.

In one embodiment, determining conversation language at block 205 includes sending one or more of audio data, a user setting and optical characteristics to a server for processing. The control device may communicate with a network device, such as a server, over a communication network to determine a conversation language for the space. In one embodiment, the space is a vehicle cabin, and conversation language includes passenger voice data detected for a vehicle cabin passenger. According to another embodiment, the space is associated with a viewing area of a display device, and conversation language includes voice data detected in the viewing area.

At block 210, process 200 can include identifying display content presented in the space on a display. In one embodiment, a control device identifies display content by determining at least one of title, source, and identifier for the display content. At block 215, the control device requests subtitle data for the display content based on the conversation language determined for the space. At least one of identified content and a title of display content may be transmitted with a determined conversation language to a server to obtain subtitle data for the display content. In one embodiment, subtitle data includes at least one of a textual and graphical representation of audio and speech data for the display content.

At block 220, process 200 includes controlling presentation of subtitle data for the display content for output on the device. The control device may output subtitle data for presentation for the determined conversation language with the display content. In one embodiment, controlling presentation of the subtitle data includes synchronizing output of the subtitle data to timing of the display content. The subtitle data may be output to be imposed on display content or presented in a desired area of the display.

In certain embodiments, controlling presentation can include displaying a notification for the subtitle data and receiving user input for the subtitle data. Presentation of the subtitle data may be in response to user input received at optional block 225. Process 200 may be performed to provide automatic subtitle presentation. Automatic subtitle presentation can include detection of one or more parameters to identify conversation language without the knowledge of the individuals in the space. Control and output of the subtitle data may then be synchronized and displayed. In one embodiment, process 200 includes detecting voice and sounds of media in addition to voice within a space. Detected audio of the media may be filtered (e.g., ignored) to allow for identification of passenger speech. In other embodiments, detection of audio media may be identified, and a speech recognition process may be performed on media audio to determine timing for presentation of subtitle information.

According to one embodiment, process 200 includes receiving user input at block 225. User input received at block 225 may be relative to a display, such as inputs to a graphical display element (e.g., graphical element 116, graphical element 166, etc.). In one embodiment, user input at block 225 includes a user selection of a graphical display element of the display to confirm subtitle data for an identified language.

According to one embodiment, process 200 includes receiving subtitle data at block 230. Subtitle data can include text and/or data to present text with display content. In certain embodiments, subtitle data may include metadata to synchronize the subtitle data with display content. By way of example, one or more of a time base and synchronization framework may be provided to control presentation of the subtitle text.

Process 200 allows for a display to present content and subtitle data without requiring user activation. In that fashion, process 200 provides automatic presentation of subtitle information. For use in a vehicle, process 200 overcomes the need for a driver to select a subtitle set, and thus avoids driver distraction. For display device operations in other settings, such as television viewing process 200 provides a functionality that is not provided by conventional devices.

Figure 3:
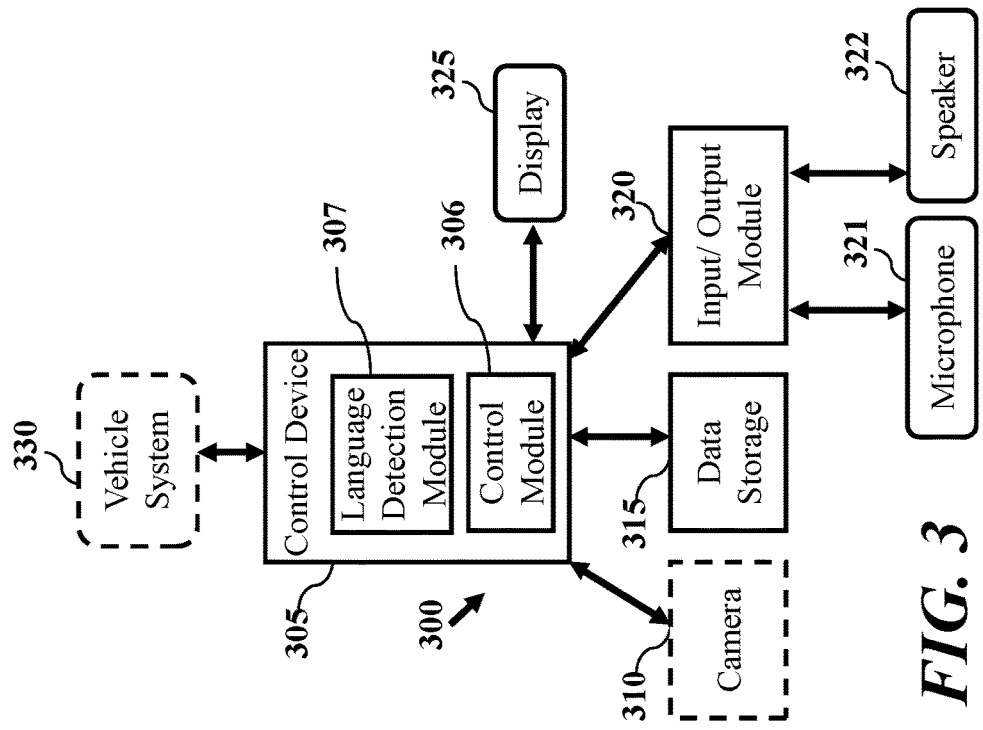
FIG. 3 depicts a graphical representation of device components according to one or more embodiments.

FIG. 3 depicts a graphical representation of display device components according to one or more embodiments. According to one embodiment, display device 300 relates to a display device such as a TV. In certain embodiments display device 300 may be a display device configured for operation in a vehicle. Display device 300 includes control device 305, data storage unit 315, input/output module 320, microphone 321, speaker 322 and display 325. According to one embodiment, display device 300 includes optional camera 310. According to another embodiment, display device 300 relates to a vehicle display device, and thus, may interoperate with one or more components of an optional vehicle system 330 to provide control signals.

According to one embodiment, display device 300 relates to a system including display 325 and control device 305. Control device 305 may be configured to determine a conversation language for a space, identify display content presented on display 325 for the space, and request subtitle data for the display content based on the conversation language determined for the space. Control device 305 may also be configured to control presentation of subtitle data for display content for output by display 325, wherein subtitle data presented is selected for the determined conversation language.

Control device 305, may be a processor, and is configured to control operation of display device 300. According to one embodiment, control device 305 may be configured to provide a control module 306 to generate control commands for the display device. Control device 305 may be configured to provide a language detection module 307 data received from at least one of microphone 321 and optional camera 310. In other embodiments, control module 306 and language detection module 307 may be physical hardware units of device 300.

Control device 305 may operate based on executable code of control module 306, language detection module 307, and data storage unit 315 to perform and control functions of display device 300. By way of example, control device 305 may execute process 200 of FIG. 2, process 400 of FIG. 4, and process 500 of FIG. 5. Control device 305 may execute and direct one or more processes and functional blocks described herein for display device operation include presentation of subtitle data.

In certain embodiments, control device 305 may use one or more processes for identifying conversation language based on parameters stored by data storage unit 315. By way of example, keywords, terms and phrases may be stored for comparison to identify language for to request subtitle data. Voice and/or speech data detected by input/output module 320 may be converted to text or machine readable representations to interpret language.

Optional camera 310 may be mounted to image one or more viewers in a space to provide image data to object detection module 307. Data storage unit 315 may be configured to store executable code to operate control device 305 and display device 300. Input/output (I/O) module 320 may be configured to receive inputs from a controller or input surface (e.g., touch screen, input buttons, etc.), display 325 and to output display content to display 325. Input/output (I/O) module 320 may operate display 325 and speaker 326 to output confirmation of one or more natural-language guidance instructions.

In certain embodiments, display device 300 and control device 305 may be configured to communicate with components of a vehicle, such as optional vehicle system 330. By way of example, optional vehicle system 330 may be configured to direct relate to a user interface system of a vehicle including one or more sensors, functions and data capabilities.

Figure 4:
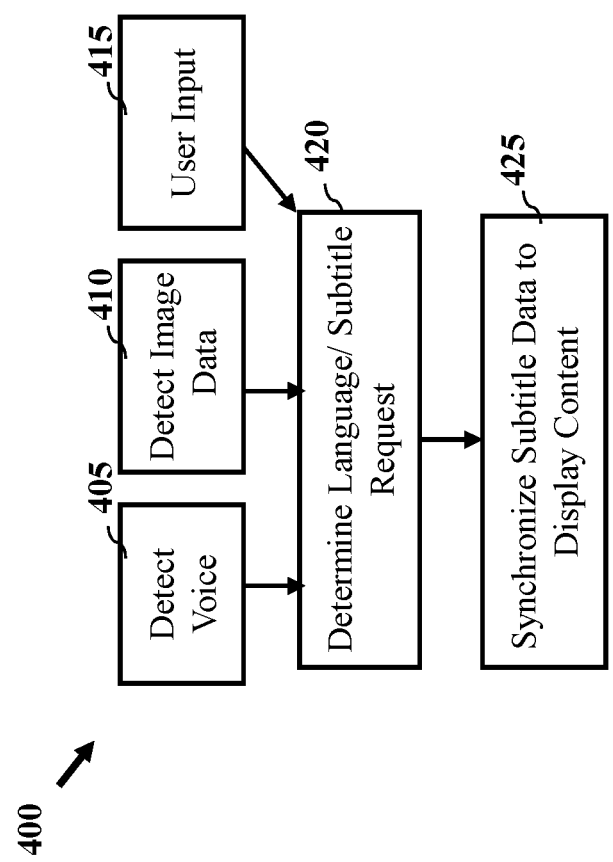
FIG. 4 depicts a process for subtitle operations according to one or more embodiments.

FIG. 4 depicts a process for subtitle operations according to one or more embodiments. According to one embodiment, determining language for subtitle data may be based on one or more attributes and data types detected by a device. According to one embodiment, process 400 may be performed by a control device of a vehicle (e.g., vehicle 105) including a display (e.g., display 110) for presentation of subtitle data. According to another embodiment, process 400 may be performed by a control device of display device (e.g., display device 160) for presentation of subtitle data. In FIG. 4, process 400 can include at least one of detecting voice (e.g., speech) at block 405, detecting image data at block 410, and receiving user input at block 415. One or more sources may be provided to determine language and perform subtitle requests at block at block 420. Voice data may be detected at block 405 while a display device is presenting content. Image data may be detected of viewers of a display device at block 410. User input at block 415 may include user settings and/or interactions with a display.

Synchronizing subtitle data at block 425 may be based on subtitle data received from a source different from the source of display content. In one embodiment, the display content may be received or output from a device local to the display, such as a media player. Subtitle data employed in block 425 may be received over a network communication, such as communication with a server. The subtitle data may be synchronized such that the graphical elements of the subtitle data presented are matched to the occurrence of voice and other sound in the display content.

Figure 5:
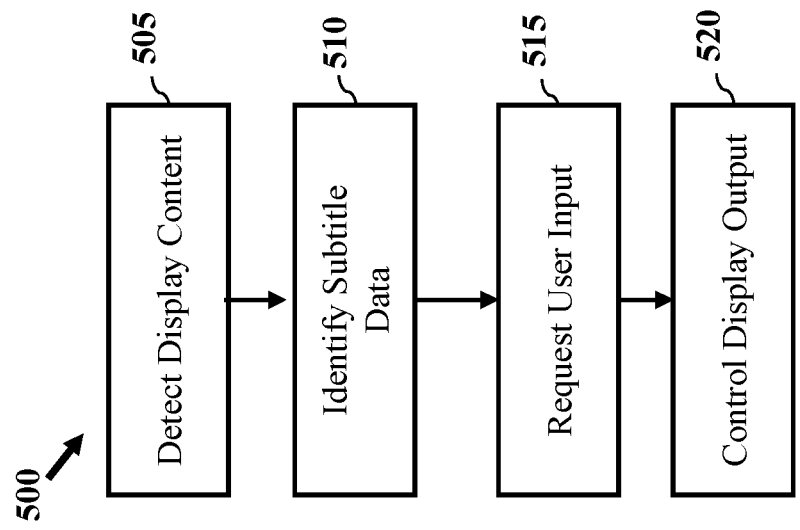
FIG. 5 depicts another process for subtitle operations according to one or more embodiments.

FIG. 5 depicts another process for subtitle operations according to one or more embodiments. According to one embodiment, user input may aid in identifying a conversation language and/or subtitle title to present. According to one embodiment, process 500 may be performed by a control device of a vehicle (e.g., vehicle 105) including a display (e.g., display 110) for presentation of subtitle data. According to another embodiment, process 500 may be performed by a control device of display device (e.g., display device 160) for presentation of subtitle data.

Process 500 may be initiated by detecting display content at block 505 and identifying subtitle data at block 510. In certain embodiments, multiple sources or sets of subtitle may be available. By way of example, display content at block 505 may relate to popular content, such as a well-known film. As such, subtitle data identified at block 510 may result in the identification of multiple files or sources of data. Alternatively, subtitle data identified at block 510 may not match a conversation language identified. Accordingly, process 500 includes operations to request user input at block 515. User input may be requested through display of a graphical element (e.g., graphical element 116, graphical element 166, etc.), audible tone and feedback of a device in general. By way of example, user input can include selection of subtitle data for a language that is not spoken in the display content. User input can include selection of a particular subtitle data set associated with an identified language or source. The user input may be received and used to by the control device to control display output at block 520. Subtitle data presented in response to display output at block 520 may be based on user input.

While this disclosure has been particularly shown and described with references to exemplary embodiments thereof, it will be understood by those skilled in the art that various changes in form and details may be made therein without departing from the scope of the claimed embodiments.

What is claimed is:

1. A method for automatic subtitle display on a display device in a vehicle, the method comprising:
   detecting, by a control device, speech of a passenger;
   detecting, by the control device, audio of media in the vehicle;
   determining, by the control device, a conversation language for a space based on the passenger speech, wherein the space is a passenger compartment of the vehicle, wherein determining the conversation language comprises identifying voice location, and at least one of acoustic modelling, keyword recognition, or temporal patterns, and wherein determining the conversation language further comprises filtering out audio of media in the vehicle;
   identifying, by the control device, display content being presented in the space on the display device;
   requesting, by the control device, subtitle data for the display content based on the conversation language determined for the space, wherein if more than one conversation language is determined for the space, the conversation language detected as having a greater word count for passenger speech is selected; and
   controlling, by the control device, presentation of subtitle data for the display content for output on the display device, wherein subtitle data presented is selected for the determined conversation language.

2. The method of claim 1, wherein determining conversation language includes performing a facial recognition operation on image data detected in the space.

3. The method of claim 1, wherein determining conversation language includes determining a user profile setting for the passenger in the space.

4. The method of claim 1, wherein the space is associated with a viewing area of a display device, and conversation language includes voice data detected in the viewing area.

5. The method of claim 1, wherein identifying display content includes determining at least one of title, source, and identifier for the display content.

6. The method of claim 1, wherein subtitle data includes at least one of a textual and graphical representation of audio and speech data for the display content.

7. The method of claim 1, wherein controlling presentation of the subtitle data includes synchronizing output of the subtitle data to timing of the display content.

8. The method of claim 1, further comprising displaying a notification for the subtitle data and receiving user input for the subtitle data, wherein presentation of the subtitle data is in response to user input received,
   wherein the user is the passenger of the vehicle.

9. The method of claim 1, wherein requesting subtitle data occurs without requiring driver programming of the subtitle data.

10. A system comprising:

a display; and a control device coupled to the display, wherein the control device is configured to:

identify display content being presented in a space on the display;

determine conversation language based on speech of a passenger, wherein if more than one conversation language is determined for the space, the conversation language detected as having a greater word count for passenger speech is selected;

request subtitle data for the display content based on the conversation language determined for the space, wherein the space is a passenger compartment of a vehicle, wherein the subtitle data is stored in a source different than the source of the display content; and control presentation of subtitle data for the display content for output on the display, wherein subtitle data presented is selected for the determined conversation language.

11. The system of claim 10, wherein determining conversation language includes performing a speech recognition operation on passenger voice data detected in the space and exclusion of audio of media in the space.

12. The system of claim 10, wherein determining conversation language includes performing a facial recognition operation on image data detected in the space.

13. The system of claim 10, wherein determining conversation language includes determining a user profile setting for the passenger in the space.

14. The system of claim 10, wherein the space is associated with a viewing area of a display device, and conversation language includes voice data detected in the viewing area.

15. The system of claim 10, wherein identifying display content includes determining at least one of title, source, and identifier for the display content.

16. The system of claim 10, wherein subtitle data includes at least one of a textual and graphical representation of audio and speech data for the display content.

17. The system of claim 10, wherein controlling presentation of the subtitle data includes synchronizing output of the subtitle data to timing of the display content.

18. The system of claim 10, wherein the control device is further configured to control display of a notification for the subtitle data and receiving user input for the subtitle data, wherein presentation of the subtitle data is in response to user input received, wherein the user is the passenger of the vehicle.

* * * * *